United States Patent
Drost et al.

(10) Patent No.: US 6,738,415 B2
(45) Date of Patent: May 18, 2004

(54) BI-DIRECTIONAL COMMUNICATION SYSTEM

(75) Inventors: Robert J. Drost, Palo Alto, CA (US); Robert J. Bosnyak, San Jose, CA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 178 days.

(21) Appl. No.: 09/815,358

(22) Filed: Mar. 22, 2001

(65) Prior Publication Data

US 2002/0181050 A1 Dec. 5, 2002

(51) Int. Cl.[7] .................................................. H04B 1/38
(52) U.S. Cl. ....................... 375/219; 375/242; 375/257; 375/259; 327/310
(58) Field of Search .............................. 375/219, 242, 375/257, 259; 327/108, 404, 310; 326/26, 30; 710/106, 312; 713/300

(56) References Cited

U.S. PATENT DOCUMENTS

| | | | |
|---|---|---|---|
| 5,604,450 A | * | 2/1997 | Borker et al. .................. 326/82 |
| 5,745,549 A | | 4/1998 | Botto et al. |
| 6,216,667 B1 | * | 4/2001 | Pekar .......................... 370/276 |
| 6,278,312 B1 | * | 8/2001 | Dabral et al. ................ 327/310 |
| 6,304,098 B1 | | 10/2001 | Drost et al. .................... 326/26 |
| 6,453,422 B1 | * | 9/2002 | Dabral et al. ................ 713/300 |
| 6,507,225 B2 | * | 1/2003 | Martin et al. ................ 327/108 |

FOREIGN PATENT DOCUMENTS

| WO | WO 00/13335 A | 3/2000 |
|---|---|---|
| WO | WO 00/29860 A | 5/2000 |
| WO | WO 00/74328 A | 12/2000 |

OTHER PUBLICATIONS

U.S. patent application filed Feb. 27, 2001, entitled "Sense Amplifier with Dual Linearly Weighted Inputs and Offset Voltage Correction", by Robert Drost and Robert Bosnyak.

U.S. patent application No. 09/580,312, filed May 26, 2000, entitled "Resistive Arrayed High Speed Output Driver with Pre–Distortion", by Robert Drost and Robert Bosnyak.

Kenichi Ishibashi, "SBTL (Simultaneous Bi–directional Transceiver Logic) for a 26.8 GB/s Crossbar Switch", Hot Interconnects VI Symp Record, Aug. 1998, pp. 73–76.

Randy Mooney, "A 900 Mb/s Bidirectional Signaling Scheme", IEEE Journal of Solid–State Circuits, vol. 30, No. 12, Dec. 1995, pp. 1538–1543.

\* cited by examiner

*Primary Examiner*—Shuwang Liu
(74) *Attorney, Agent, or Firm*—Zagorin, O'Brien & Graham, LLP

(57) ABSTRACT

A bi-directional communication system and transceiver configuration are described, which employ a bi-directional reference to account for both common-mode and differential noise introduced at either end of a bi-directional communication channel. Some implementations exploit the techniques described in a bi-directional chip-to-chip communication scheme. In some implementations, the advantages of bi-directional reference techniques described herein are obtained while pre-distortion of transmitted signals is employed to compensate for intersymbol interference (ISI) in a communications channel.

41 Claims, 11 Drawing Sheets

| OUTGOING DATA | INCOMING DATA | COMBINED LEVEL ON "BIPAD" | | PROFILE 1* | PROFILE 2** |
|---|---|---|---|---|---|
| 0 | 0 | avg(Olo,Ilo) | = 0.5 Olo + 0.5 Ilo | 0.0 | 0.0 |
| 0 | 1 | avg(Olo,Ihi) | = 0.5 Olo + 0.5 Ihi | 0.5 | 0.5 |
| 1 | 0 | avg(Ohi,Ilo) | = 0.5 Ohi + 0.5 Ilo | 0.5 | 1.0 |
| 1 | 1 | avg(Ohi,Ihi) | = 0.5 Ohi + 0.5 Ihi | 1.0 | 1.5 |
| reference if outgoing data is low | | = avg[avg(Olo,Ilo),avg(Olo,Ihi)] | = 0.5 Olo + 0.25 Ilo + 0.25 Ihi | 0.25 | 0.25 |
| reference if outgoing data is high | | = avg[avg(Ohi,Ilo),avg(Ohi,Ihi)] | = 0.5 Ohi + 0.25 Ilo + 0.25 Ihi | 0.75 | 1.25 |

*Profile 1:  Ohi = 1.0;  Olo = 0.0;  Ihi = 1.0;  Ilo = 0.0;
**Profile 2:  Ohi = 2.0;  Olo = 0.0;  Ihi = 1.0;  Ilo = 0.0;

FIG. 9

SCENARIO 1:
Equal level on both chips
Ohi = 1.0 Volts
Olo = 0.0 Volts
Ihi = 1.0 Volts
Ilo = 0.0 Volts

SCENARIO 2:
Nominally equal level on both chips
with 0.25 volt differential noise
Ohi = 1.25 Volts
Olo = -0.25 Volts
Ihi = 0.75 Volts
Ilo = 0.25 Volts Coefficients of output levels

A:

| | Ohi | Olo | Ihi | Ilo |
|---|---|---|---|---|
| Reflo | 0.125 | 0.375 | 0.125 | 0.375 |
| Refhi | 0.375 | 0.125 | 0.375 | 0.125 |

| Data Out | Data In | Bipad Signal | Ref Signal | Bipad - Ref | Signal Amp % |
|---|---|---|---|---|---|
| 0 | 0 | 0.00 | 0.25 | -0.25 | 100% |
| 0 | 1 | 0.50 | 0.25 | 0.25 | 100% |
| 1 | 0 | 0.50 | 0.75 | -0.25 | 100% |
| 1 | 1 | 1.00 | 0.75 | 0.25 | 100% |

| Data Out | Data In | Bipad Signal | Ref Signal | Bipad - Ref | Signal Amp % |
|---|---|---|---|---|---|
| 0 | 0 | 0.00 | 0.25 | -0.25 | 200% |
| 0 | 1 | 0.25 | 0.25 | 0 | 0% |
| 1 | 0 | 0.75 | 0.75 | 0 | 0% |
| 1 | 1 | 1.00 | 0.75 | 0.25 | 200% |

B:

| | Ohi | Olo | Ihi | Ilo |
|---|---|---|---|---|
| Reflo | 0.25 | 0.75 | | |
| Refhi | 0.75 | 0.25 | | |

| Data Out | Data In | Bipad Signal | Ref Signal | Bipad - Ref | Signal Amp % |
|---|---|---|---|---|---|
| 0 | 0 | 0.00 | 0.25 | -0.25 | 100% |
| 0 | 1 | 0.50 | 0.25 | 0.25 | 100% |
| 1 | 0 | 0.50 | 0.75 | -0.25 | 100% |
| 1 | 1 | 1.00 | 0.75 | 0.25 | 100% |

| Data Out | Data In | Bipad Signal | Ref Signal | Bipad - Ref | Signal Amp % |
|---|---|---|---|---|---|
| 0 | 0 | 0.00 | 0.13 | -0.13 | 100% |
| 0 | 1 | 0.25 | 0.13 | 0.13 | 100% |
| 1 | 0 | 0.75 | 0.88 | -0.13 | 100% |
| 1 | 1 | 1.00 | 0.88 | 0.13 | 100% |

C:

| | Ohi | Olo | Ihi | Ilo |
|---|---|---|---|---|
| Reflo | 0.5 | 0.5 | 0.25 | 0.25 |
| Refhi | 0.5 | 0.5 | 0.25 | 0.25 |

| Data Out | Data In | Bipad Signal | Ref Signal | Bipad - Ref | Signal Amp % |
|---|---|---|---|---|---|
| 0 | 0 | 0.00 | 0.25 | -0.25 | 100% |
| 0 | 1 | 0.50 | 0.25 | 0.25 | 100% |
| 1 | 0 | 0.50 | 0.75 | -0.25 | 100% |
| 1 | 1 | 1.00 | 0.75 | 0.25 | 100% |

| Data Out | Data In | Bipad Signal | Ref Signal | Bipad - Ref | Signal Amp % |
|---|---|---|---|---|---|
| 0 | 0 | 0.00 | 0.13 | -0.13 | 100% |
| 0 | 1 | 0.25 | 0.13 | 0.13 | 100% |
| 1 | 0 | 0.75 | 0.88 | -0.13 | 100% |
| 1 | 1 | 1.00 | 0.88 | 0.13 | 100% |

SCENARIO 3:
Nominally equal level on both chips
with 0.25 volt common-mode noise Ohi = 1.25 Volts
Olo = 0.25 Volts
Ihi = 0.75 Volts
Ilo = -0.25 Volts

SCENARIO 4:
Outgoing signal 2x larger than
Incoming signal

Ohi = 2.0 Volts
Olo = 0.0 Volts
Ihi = 1.0 Volts
Ilo = 0.0 Volts

Coefficients of output levels

A:

| | Ohi | Olo | Ihi | Ilo |
|---|---|---|---|---|
| Reflo | 0.125 | 0.375 | 0.125 | 0.375 |
| Refhi | 0.375 | 0.125 | 0.375 | 0.125 |

Scenario 3 (A):

| Data Out | Data In | Bipad Signal | Ref Signal | Bipad − Ref | Signal Amp % |
|---|---|---|---|---|---|
| 0 | 0 | 0.00 | 0.25 | −0.25 | 100% |
| 0 | 1 | 0.50 | 0.25 | 0.25 | 100% |
| 1 | 0 | 0.50 | 0.75 | −0.25 | 100% |
| 1 | 1 | 1.00 | 0.75 | 0.25 | 100% |

Scenario 4 (A):

| Data Out | Data In | Bipad Signal | Ref Signal | Bipad − Ref | Signal Amp % |
|---|---|---|---|---|---|
| 0 | 0 | 0.00 | 0.38 | −0.38 | 150% |
| 0 | 1 | 0.50 | 0.38 | 0.13 | 50% |
| 1 | 0 | 1.00 | 1.13 | −0.13 | 50% |
| 1 | 1 | 1.50 | 1.13 | 0.38 | 150% |

B:

| | Ohi | Olo | Ihi | Ilo |
|---|---|---|---|---|
| Reflo | 0.25 | 0.75 | | |
| Refhi | 0.75 | 0.25 | | |

Scenario 3 (B):

| Data Out | Data In | Bipad Signal | Ref Signal | Bipad − Ref | Signal Amp % |
|---|---|---|---|---|---|
| 0 | 0 | 0.00 | 0.5 | −0.5 | 200% |
| 0 | 1 | 0.50 | 0.5 | 0 | 0% |
| 1 | 0 | 0.50 | 1 | −0.5 | 200% |
| 1 | 1 | 1.00 | 1 | 0 | 0% |

Scenario 4 (B):

| Data Out | Data In | Bipad Signal | Ref Signal | Bipad − Ref | Signal Amp % |
|---|---|---|---|---|---|
| 0 | 0 | 0.00 | 0.5 | −0.5 | 200% |
| 0 | 1 | 0.50 | 0.5 | 0 | 0% |
| 1 | 0 | 1.00 | 1.5 | −0.5 | 200% |
| 1 | 1 | 1.50 | 1.5 | 0 | 0% |

C:

| | Ohi | Olo | Ihi | Ilo |
|---|---|---|---|---|
| Reflo | 0.5 | 0.5 | 0.25 | 0.25 |
| Refhi | 0.5 | 0.5 | 0.25 | 0.25 |

Scenario 3 (C):

| Data Out | Data In | Bipad Signal | Ref Signal | Bipad − Ref | Signal Amp % |
|---|---|---|---|---|---|
| 0 | 0 | 0.00 | 0.25 | −0.25 | 100% |
| 0 | 1 | 0.50 | 0.25 | 0.25 | 100% |
| 1 | 0 | 0.50 | 0.75 | −0.25 | 100% |
| 1 | 1 | 1.00 | 0.75 | 0.25 | 100% |

Scenario 4 (C):

| Data Out | Data In | Bipad Signal | Ref Signal | Bipad − Ref | Signal Amp % |
|---|---|---|---|---|---|
| 0 | 0 | 0.00 | 0.25 | −0.25 | 100% |
| 0 | 1 | 0.50 | 0.25 | 0.25 | 100% |
| 1 | 0 | 1.00 | 1.25 | −0.25 | 100% |
| 1 | 1 | 1.50 | 1.25 | 0.25 | 100% |

BI-DIRECTIONAL COMMUNICATION SYSTEM

BACKGROUND OF THE INVENTION

1. Field of the Invention

The present invention relates to bi-directional communication systems and, in particular, to techniques for enhancing noise immunity of such communication systems.

2. Description of the Related Art

Bi-directional communication has several advantages over unidirectional communication. For example, in some applications, physical connection points may be reduced by a factor that approaches two. In a chip-to-chip communication application where pin out, bonding pad or other connection point limitations may be significant, bi-directional communication can allow wider data widths using a fixed number of connection points. In other applications, transmission, routing or switching complexity may be reduced by replacing separate unidirectional facilities.

In a bi-directional communication system, a pair of transceivers transmit and receive data signals via a bi-directional transmission line or channel. Signals simultaneously transmitted by the transceivers are superimposed as a combined data signal. This combined data signal typically includes system noise from each of the transceiver systems. For example, in an application where transceivers are implemented as part of separate integrated circuit chips with separate supply voltage distribution systems, each transceiver may experience source of supply voltage noise or disturbance, e.g., switching noise, voltage bounces and collapses. Such supply voltage noise manifests itself in signals communicated from chip to chip. For example, data signals exhibit differential and/or common-node noise.

To realize the benefits of bi-directional signaling, the signal sent into the transmission line by a local transmitter is removed from the combined signal to recover the received signal, i.e., to recover the signal transmitted by a remote transceiver. Echo cancellation techniques can be used to remove local transmitter contributions. However, technical challenges exist in performing echo cancellation with low phase and amplitude errors, without significant additional pin overhead, and without coupling crosstalk noise into adjacent signaling channels. Furthermore, it may be desirable to employ transmitter-side techniques such as pre-distortion to account for channel characteristics such as intersymbol interference (ISI) and thereby improve channel capacity. Predistortion presents additional technical challenges.

Mooney et al. disclose a bi-directional communications scheme that employs a pair of bi-directional references (corresponding to high and low voltages, respectively) and switches between the respective references based on the current signal voltage of outgoing transmitted data. See Mooney et al., *A 900 Mb/s Bidirectional Signalling Scheme*, IEEE Journal of Solid-State Circuits, Vol. 30, No. 12 (1995). Mooney's technique has several limitations. First, since the bi-directional references are shared amongst multiple channels to reduce pin overhead, the references will experience data-dependent noise such as from switched capacitor loading associated with each channel's data-dependent selection of the appropriate high or low reference channel. In addition, since Mooney's references are respectively biased at high and low voltages, they do not track differential supply collapses and bounces. Furthermore, Mooney's data dependent selection of the appropriate high or low reference is unable to account for variation, such predistortion, of a local transmitter output.

Ishibashi et al. disclose bi-directional transceiver logic for a crossbar switch. See, Ishibashi et al. SBTL (Simultaneous Bi-directional Transceiver Logic) for a 26.8 GB/s Crossbar Switch, Hot Interconnects VI Symposium Record (August 1998). Ishibashi employs a local echo signal to extract incoming data from a combined bi-directional signal. However, a local-only reference is used and no provision is made for tracking supply noise at an opposing end of the bi-directional transmission line. Accordingly, Ishibashi's scheme is vulnerable to both common mode and differential supply noise at the opposing end.

SUMMARY

Improved techniques are desired. For example, techniques are desired whereby both common-node and differential supply noise may be tracked. In particular, receiver techniques are desired whereby common-node and differential supply noise at both ends of a bi-directional transmission line can be tolerated. In addition, techniques are desired whereby references employed by a receiver may account for pre-distortion of an outgoing signal, if employed by the local transmitter. Furthermore, it is desirable that reference circuitry employed in a transceiver implementation avoid coupling data dependent switching noise between transmission channels. Some or all of the foregoing features and advantages are realized by various systems, circuits and methods in accordance with the present invention.

In one embodiment in accordance with the present invention, a bi-directional communication system includes a pair of integrated circuits, each implementing a transceiver for communication on a bi-directional transmission line, wherein an additional bi-directional reference line is utilized to compensate for both common-mode and differential supply noise introduced at either integrated circuit.

In another embodiment in accordance with the present invention, a transceiver for bi-directional communications via a channel includes a bi-directional data node for coupling to the bi-directional communications channel, a bi-directional reference node for coupling to a bi-directional reference channel, and a receiver circuit. The receiver circuit, which is coupled to both the bi-directional data node and the bi-directional reference node, tracks both common-mode and differential noise introduced at an opposing end of the communications channel. In one variation, the transceiver includes a transmit circuit that predistorts an outgoing signal transmitted via the bi-directional communications channel. The receiver circuit of such a transceiver combines a predistorted data-dependent local echo signal and a data-independent bi-directional reference signal coupled from the bi-directional reference node. In another variation, additional bi-directional data nodes are provided for coupling to respective additional bi-directional communication channels and the receiver circuit extracts an incoming signal from that presented at the bi-directional data node without reference channel switching induced crosstalk amongst the bi-directional communication channels.

In another embodiment in accordance with the present invention, an apparatus includes a transmit circuit coupled to a bi-directional data node, an echo data node, a local reference node, a bi-directional reference node and a receiver circuit. The receiver circuit is coupled to the bi-directional data node, the echo data node, the local reference node and the bi-directional reference node to combine signals presented thereon. The receiver circuit extracts an incoming signal component from that presented at the bi-directional data node and compensates for both common-mode and differential noise introduced at either end of a bi-directional communications channel coupled thereto.

In still another embodiment in accordance with the present invention, a bi-directional communication system includes a bi-directional reference channel, plural bi-directional communication channels, and a first transceiver including plural receivers each coupled to a respective one of the bi-directional communication channels. The receivers are further coupled to the bi-directional reference channel and to respective local reference nodes. In one variation, the bi-directional communication system includes a second transceiver including plural receivers each coupled to a respective one of the bi-directional communication channels. These receivers are further coupled to the bi-directional reference channel and to respective reference nodes local thereto. In some variations, the first and second transceivers reside on separate integrated circuit chips.

In still yet another embodiment in accordance with the present invention, bi-directional signaling method includes receiving on a bi-directional transmission line, a data signal that includes both an incoming signal and an outgoing signal transmitted thereon; receiving on a bi-directional reference transmission line, a bi-directional reference signal including both an incoming reference and an outgoing reference contribution thereto; and obtaining the incoming signal from the data signal using a composite data-dependent reference including contributions of the bi-directional reference signal, a local reference signal, and a local echo signal corresponding to the outgoing signal.

BRIEF DESCRIPTION OF THE DRAWINGS

The present invention may be better understood, and its numerous objects, features, and advantages made apparent to those skilled in the art by referencing the accompanying drawings.

FIG. 9 illustrates, in tabular form, desired reference values for specific outgoing and incoming signal levels.

FIGS. 10A and 10B illustrate performance of various bi-directional communication systems in various signaling scenarios.

The use of the same reference symbols in different drawings indicates similar or identical items.

DESCRIPTION OF THE PREFERRED EMBODIMENT(S)

The present invention employs techniques to improve bi-directional communication. In some exemplary embodiments described below, bi-directional transmission lines such as printed circuit board (PUB) traces couple a pair of integrated circuit (IC) transceiver implementations for bi-directional chip-to-chip communications. While such embodiments are illustrative, the invention is not limited to them. Indeed, based on the description herein, persons of ordinary skill in the art will appreciate a variety of alternative transceiver and communication channel configurations that exploit techniques and designs described herein and which fall within the scope of the claims that follow.

Subject to the foregoing and briefly in overview, some embodiments of the present invention involve simultaneous transmission and reception of data signals over a shared transmission line. In such a system, noise (such as common-node or differential noise) from each device can be transferred onto the shared transmission line. Implementations in accordance with the present invention employ a shared bi-directional reference to track and compensate for such noise. The bi-directional reference combines local references from each of the two devices. In some realizations, the local reference is an average of the high and low output values utilized in transmitting data signals between the two devices. By removing the local noise from the bi-directional reference, the noise from the other device can be isolated and be compensated for in the process of obtaining the received data signals on the shared transmission line.

Figure 5:
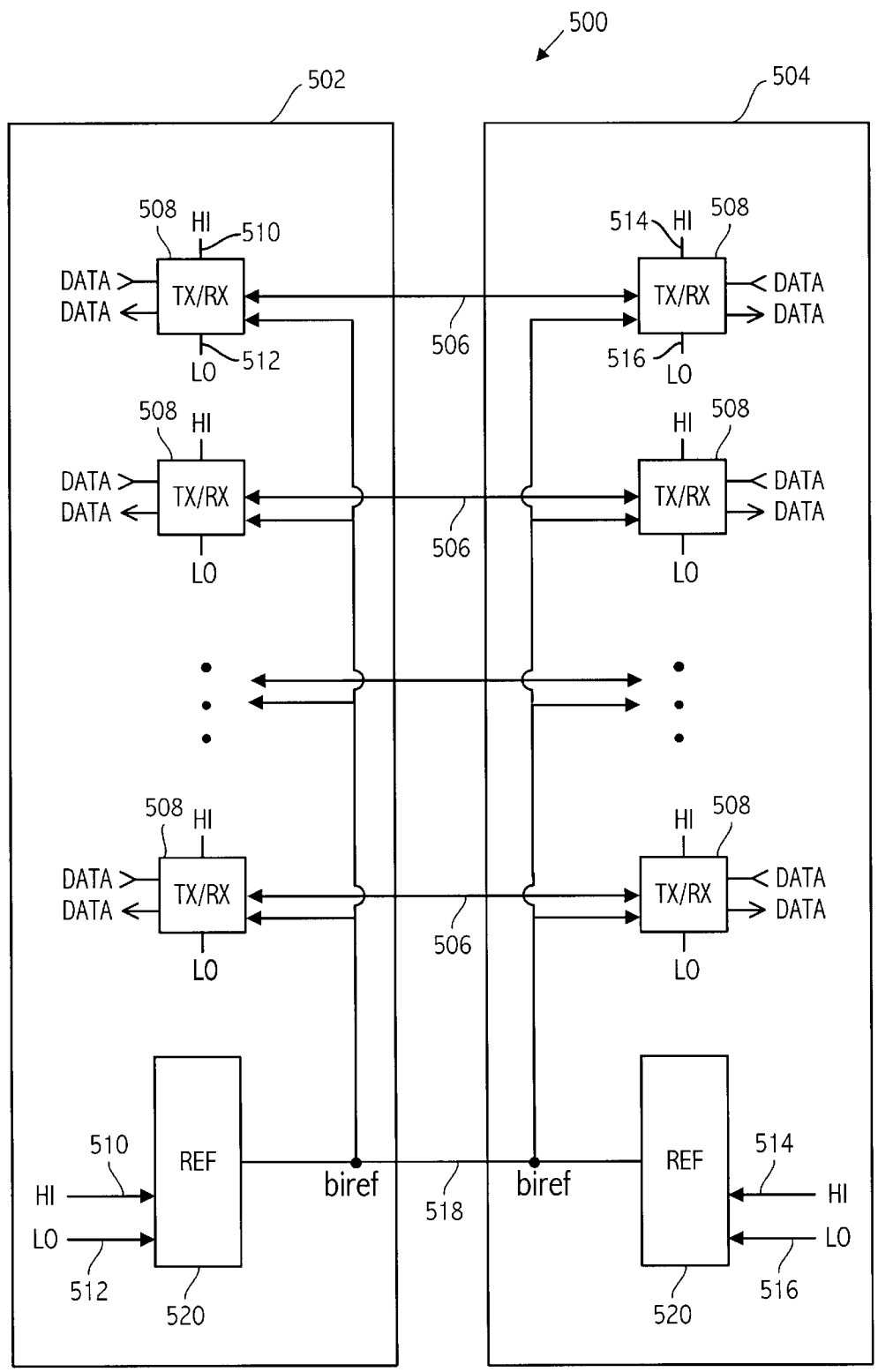
FIG. 5 depicts a block diagram of a bi-directional communication system in which a pair of integrated circuit chips, each with multiple transceivers, communicate via multiple bi-directional communications channels using a single bi-directional reference channel in accordance with some embodiments of the present invention.

An illustrative bi-directional chip-to-chip communication system 500 is illustrated in FIG. 5. The bi-directional communication system includes a pair of ICs 502 and 504, each implementing multiple transceivers 508 to transmit and receive signals over respective communication channels that can be represented as transmission lines 506. In one realization, the ICs are located on a printed circuit board (PCB) and transmission lines include line traces on the PCB. More generally, bi-directional communications channels between transceivers may include other structures such as on-chip traces, vias, package structures, wire bonds, pins, connectors, solder balls, cables, wires, etc. A bi-directional reference channel (represented as transmission line 518) is shared amongst the various transceivers 508 and employed to provide substantial immunity to both common-mode and differential supply noise introduced by either IC.

Data signals are transmitted by transceivers 508 via respective transmission lines. In a typical binary data encoding, transmitted signal levels correspond to local supply voltage levels. For example, levels of data signals transmitted by transceivers of IC 502 onto transmission lines 506 may be bounded by the local high supply value 510 and the local low supply value 512. Likewise, levels of data signals transmitted by transceivers of IC 504 may be bounded by the local high supply value 514 and the local low supply value 516.

Figure 1A:
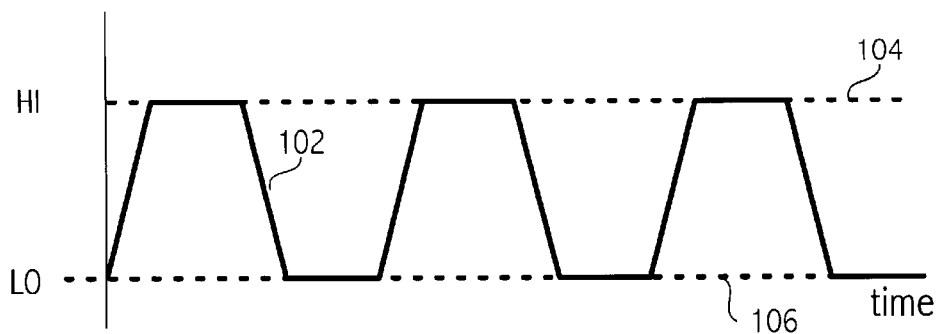
FIGS. 1A, 1B and 1C respectively illustrate an ideal data signal, differential supply noise, and a version of the data signal including effects of the differential supply noise.

In such a configuration, variations (or noise) in the local supply voltages can affect transmitted signals. Typically, both differential and common-mode noise affect transceiver circuits. For example, the effect of differential supply noise on a simple data signal can be seen in FIGS. 1A, 1B and 1C. FIG. 1A illustrates a data signal 102 that encodes information using a pair of high and low signal values 104 and 106, respectively. For purposes of the illustration, signal levels correspond to supply voltage levels. Persons of ordinary skill in the art will appreciate that the correspondence is merely illustrative.

Figure 1B:
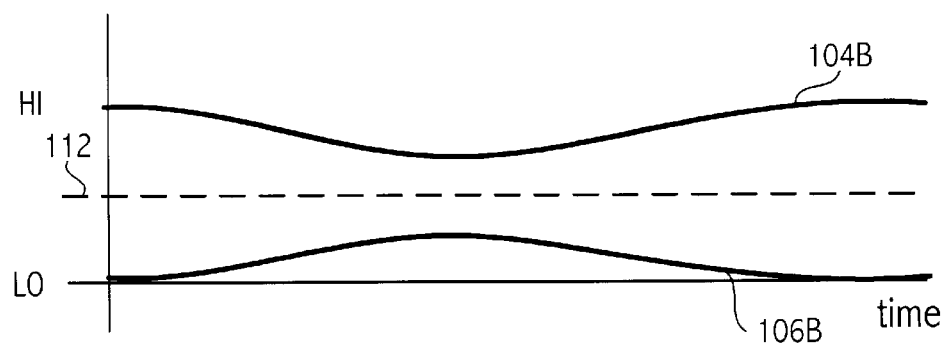
Figure 1C:
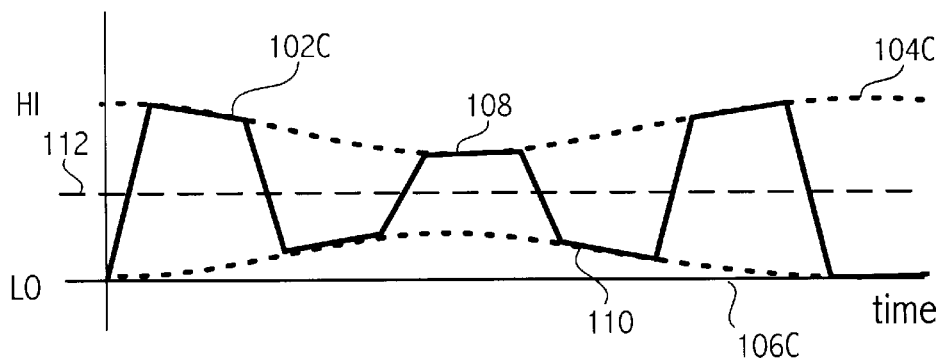

FIG. 1B depicts differential supply noise affecting the high and low supply voltage levels. Affected supply voltages 104B and 106B are illustrative. Circuits that employ such supply voltages will typically introduce differential noise into a data signal. FIG. 1C illustrates such an effect on the idealized data signal of FIG. 1A. In particular, portions of the affected signal (e.g., portions 108 and 110) of affected data signal 102C illustrate the potential impact of differential supply noise. One characteristic of the differential noise is that even affected values (e.g., high and low supply voltage levels) are displaced symmetrically around a midpoint value 112.

Figure 2A:
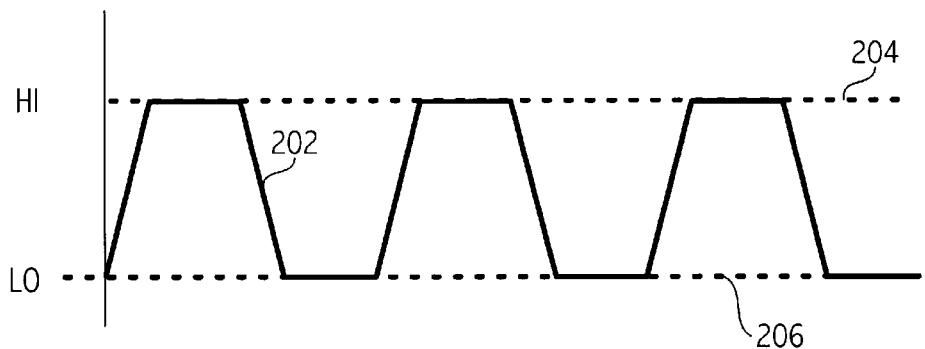
FIGS. 2A, 2B and 2C respectively illustrate an ideal data signal, common-mode supply noise, and a version of the data signal including effects of the common-mode supply noise.
Figure 2B:
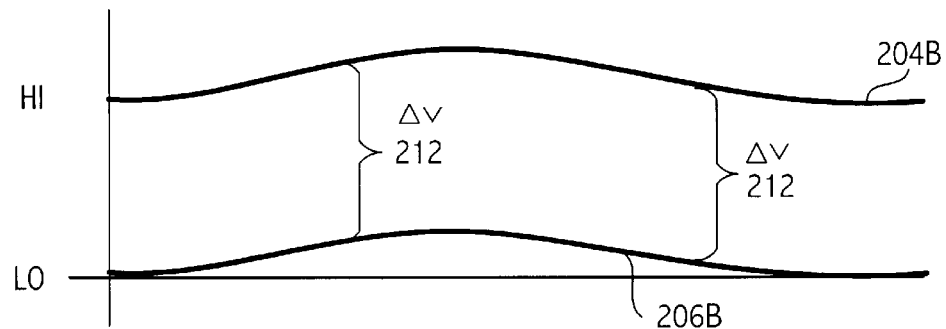
Figure 2C:
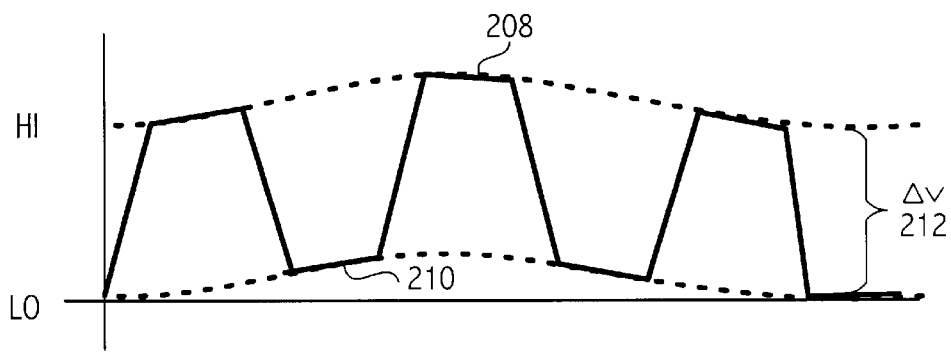

Effects of common-node supply noise on a simple data signal are illustrated in FIGS. 2A, 2B and 2C. FIG. 2A illustrates a data signal 202 that encodes information using a pair of high and low signal values 204 and 206, respectively. FIG. 2B depicts common-mode supply noise affecting the high and low supply voltage levels. Affected supply voltages 204B and 206B are illustrative. As before, circuits that employ such supply voltages will typically introduce common-mode noise into a data signal.

FIG. 2C illustrates the effect of common-mode supply noise on the idealized data signal of FIG. 2A. In particular, portions of the affected signal (e.g., portions 208 and 210) of affected data signal 102C illustrate the potential impact of common-mode supply noise. One characteristic of common-mode noise is that the displacement between affected values (e.g., high and low supply voltage levels) is essentially constant as illustrated by voltage difference 212.

Referring again to FIG. 5, bi-directional reference line 518 allows each IC to track supply variations at the other IC. In particular, in a configuration to track both differential and common-mode supply noise, each IC includes a reference circuit 520 that couples an average (or mid-point) local supply voltage onto bi-directional reference line 518. As illustrated in FIG. 5, the transceivers share a single bi-directional reference. Of course, persons of ordinary skill in the art will recognize that to properly track noise, data signals on lines 506 need to be phase matched with the reference on bi-directional line 518. Accordingly, suitable routing, layout and/or circuit techniques will be employed to assure phase matching and the illustration of FIG. 5 does not necessarily correspond to routing or layouts employed in any particular implementation.

Figure 6:
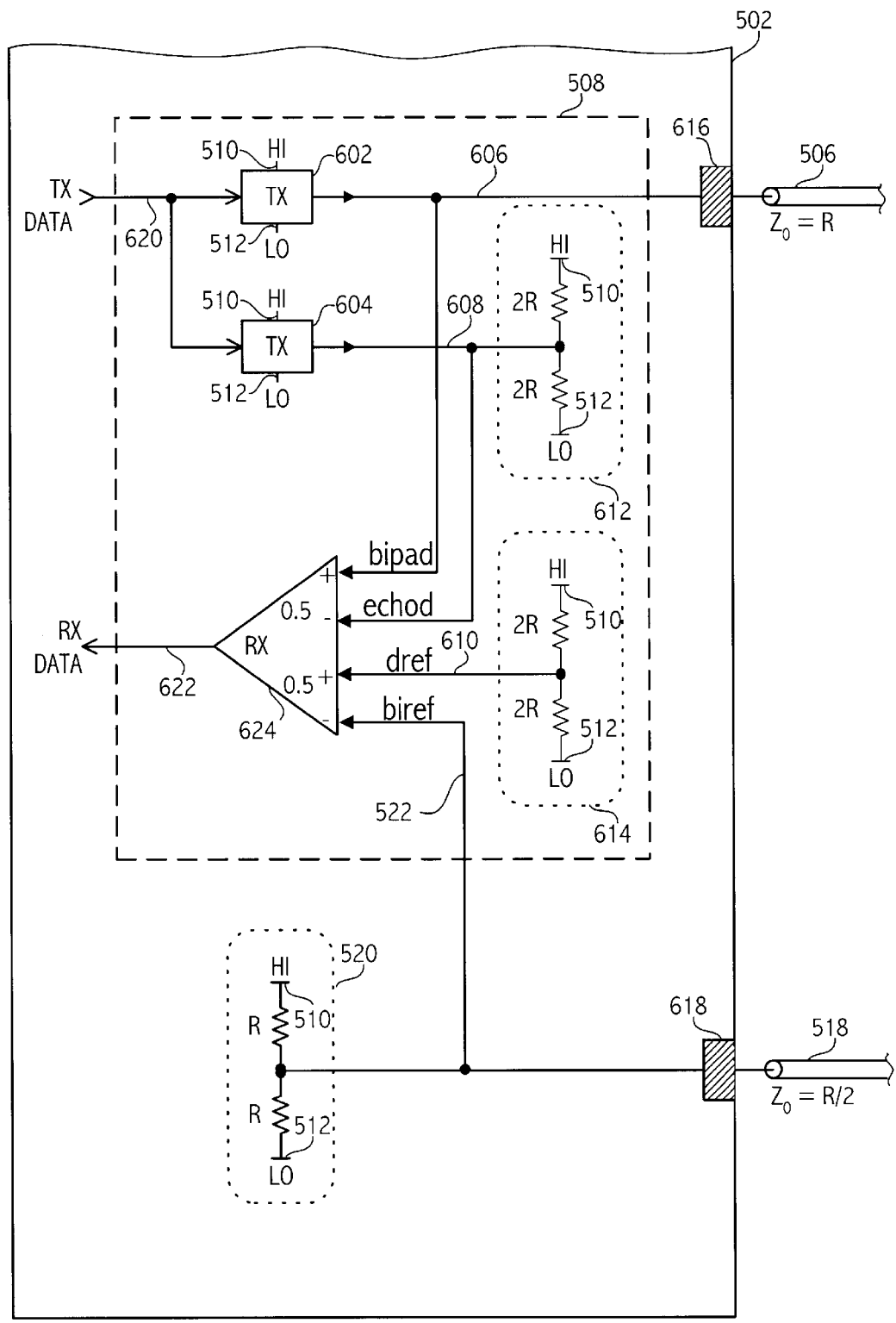
FIG. 6 depicts a circuit block diagram a transceiver and bi-directional reference circuit in accordance with some embodiments of the present invention.

FIG. 6 illustrates aspects of one realization of the bi-directional communication system described above. For purposes of illustration, a single bi-directional communications channel is shown and corresponding structures at an opposing-end of bi-directional communications and reference channels are omitted. Since realizations of the bi-directional communication system are generally symmetric in terms of circuit elements and connections, it is helpful (as in FIG. 6) to take the vantage point from one transceiver during the explanation of the system's operation. Relative to FIG. 5, the description that follows can be viewed from the frame of reference of one of the transceivers 508 on IC 502. Terms such as incoming or outgoing will be understood accordingly.

FIG. 6 illustrates a single instance of transceiver 508 coupled for bi-directional communications over a corresponding instance of transmission line 506. Transceiver 508 is also coupled to bi-directional reference line 518. An exemplary realization of reference circuit 520 is also illustrated.

In one configuration, an outgoing data stream 620 is supplied to two matched transmitter circuits 602 and 604. Typically, transmitter circuits 602 and 604 are implemented as substantially identical circuits, although other configurations that provide an echo signal are also suitable. In the illustrated configuration, the output of transmitter circuit 602 drives a bi-directional data node (bipad), while the output of transmitter circuit 604 drives an echo data node (echod). Transmitter circuits 602 and 604 are replicated and share the same data input in order to accurately match the phase of the bipad and echod signals. In the illustrated configuration, the echod signal is loaded by a resistor divider 612 between high and low output signal levels, $O_{HI}$ and $O_{LO}$.

Another resistor divider 614 is used to construct a local reference, dref, while a third resistor divider operates as reference circuit 520 to construct a bi-directional reference (biref). In the illustrated configuration, resistor dividers tend to drive respective circuit nodes to a midpoint between the high and low output signal levels (i.e., to $\frac{1}{2}O_{HI}+\frac{1}{2}O_{LO}$). The local reference, dref, and echo signal, echod, are local signals or nodes that need not be (and preferably are not) propagated from chip to chip. On the other hand, the biref reference or node is coupled (via bi-directional reference line 518) to a corresponding node employed by a remote transceiver. The biref reference allows opposing-end transceivers to account for noise introduced by the other transceiver into an incoming signal.

As described above, it is important that the bipad transmission channel and the biref transmission channel (including transmission line 506 and bi-directional reference line 518, respectively) exhibit matched delays. Otherwise, noise-canceling information on the biref channel could be out of phase with noise affecting the bipad signal. Preferably, bi-directional reference line 518 and transmission line 506 exhibit respective impedances that are selected, at least in part, to match the transfer functions associated with noise source to data signal noise transfer to that associated with noise source to reference signal noise transfer. In this regard, techniques for matching noise transfer functions are described in greater detail in U.S. patent application Ser. No. 09/524,683, filed Mar. 14, 2000, entitled "Method and Apparatus for Reducing Noise in Communication Channels Having a Shared Reference Signal," and naming Drost and Wilhelm as inventors, having now been issued on Oct. 16, 2001 as U.S. Pat. No. 6,304,098, the entirety of which is incorporated herein by reference. For example, in the illustration of FIG. 6, the biref reference is constructed with half the impedance of the bipad signal. While the impedance relation is not essential to implementations in accordance with the present invention, implementations constructed in accordance therewith may exhibit some advantages such as those described in the above-identified U.S. patent application.

Figure 7A:
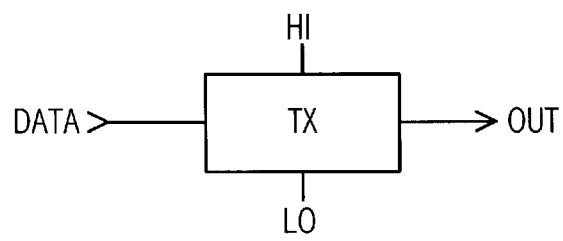
FIGS. 7A. 7B, 7C and 7D illustrate a block diagram and several circuit diagrams for a transmitter configuration that may be employed in some realizations of the present invention.
Figure 7B:
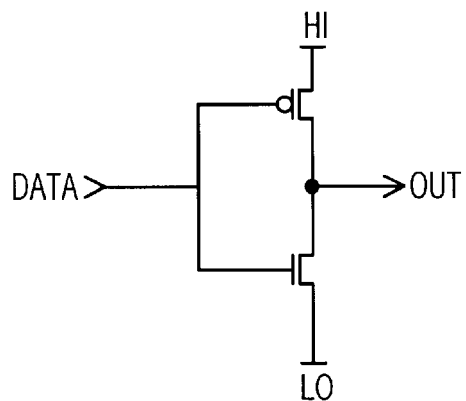
Figure 7C:
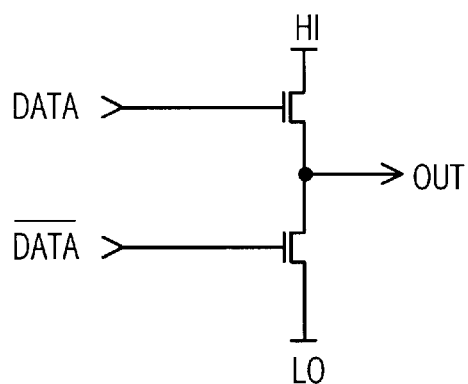
Figure 7D:
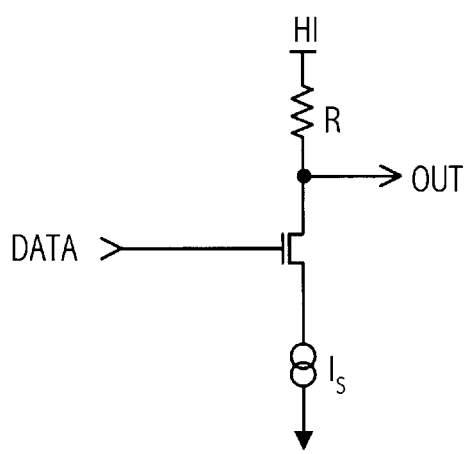

FIGS. 7A, 7B, 7C and 7D illustrate a block diagram and several circuit diagrams for transmitter configurations that may be employed in some realizations of the present invention. Two general classes of output drivers are voltage mode and current mode drivers. In a voltage mode driver such as illustrated in FIGS. 7B and 7C, the output transistors are turned "on" and operate in the triode region connecting the output node to either the high or low output level (e.g., $O_{HI}$ or $O_{LO}$). The resistance of the output transistor in a voltage mode driver can also act to terminate the transmission line that constitutes the channel. In a current mode driver such as illustrated in FIG. 7D, the output transistor is operated in the saturation region and acts to source or sink a current onto the output node. The termination resistor for the transmission line converts the current into a voltage level. For the current-mode driver, the $O_{LO}$ level is equal to $O_{HI}-I_S$ R, where $I_S$ is the saturated current.

While the illustrated transmitter configurations are each suitable, other transmitter configurations may provide advantages that, though independent of the present invention, may still be desirable in certain implementations. For example, the output driver described in U.S. patent application Ser. No. 09/580,312, filed May 26, 2000, entitled "Resistive Arrayed High Speed Output Driver with Pre-Distortion," and naming Drost and Bosnyak as inventors, having now been issued on Dec. 11, 2001 as U.S. Pat. No. 6,329,836, is illustrative. Such a transmitter configuration includes multiple outputs that are tri-stated and turned on in a round-robin fashion in order to operate at very high speeds. The output driver synthesizes an output waveform that behaves similarly to a single resistive drive element responding to a non-bandlimited input signal. In some variations, the output driver provides digitally programmable output impedance control and/or pre-distortion levels. The basic output driver of that transmitter is a voltage-mode driver with NMOS transistors such as illustrated in FIG. 7C. As a description of certain exemplary realizations of transmitter circuits suitable for use in or in conjunction with certain embodiments of the present invention, and without limitation thereon, U.S. patent application Ser. No. 09/580, 312 is incorporated herein by reference in its entirety. Other suitable transmitter designs (including transmitter designs providing pre-distortion capabilities) are well known in the art.

Figure 8:
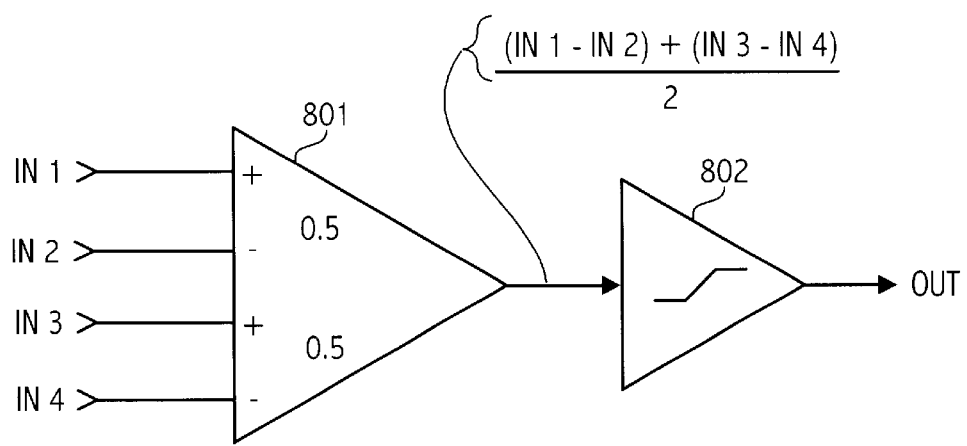
FIG. 8 illustrates a block diagram for a receiver configuration that may be employed in some realizations of the present invention.

FIG. 8 illustrates a receiver configuration that may be employed in some realizations of the present invention. In particular, the illustrated circuit block performs two functions. First, it applies (801) the mathematical function shown: [(in1−in2)+(in3−in4)]/2. Then, it takes the value of that function and feeds it into a decision amplifier 802. The decision amplifier produces a digital "high" value on its output node when the function's value is positive, and a digital "low" value on its output node when the function's value is negative. While a variety of implementations are suitable, a presently preferred circuit implementation is described in greater detail in U.S. Pat. No. 6,396,308, filed Feb. 27, 2001 and issued on May 28, 2002, entitled "Sense Amplifier with Dual Linearly Weighted Inputs and Offset Voltages Correction," and naming Bosnyak and Drost as inventors, which is incorporated herein by reference in its entirety. Such an implementation uses transistor capacitance and regenerative sense amplifiers to provide the function and decision amplifier functions described above. Other suitable receiver designs are well known in the art.

Figure 3:
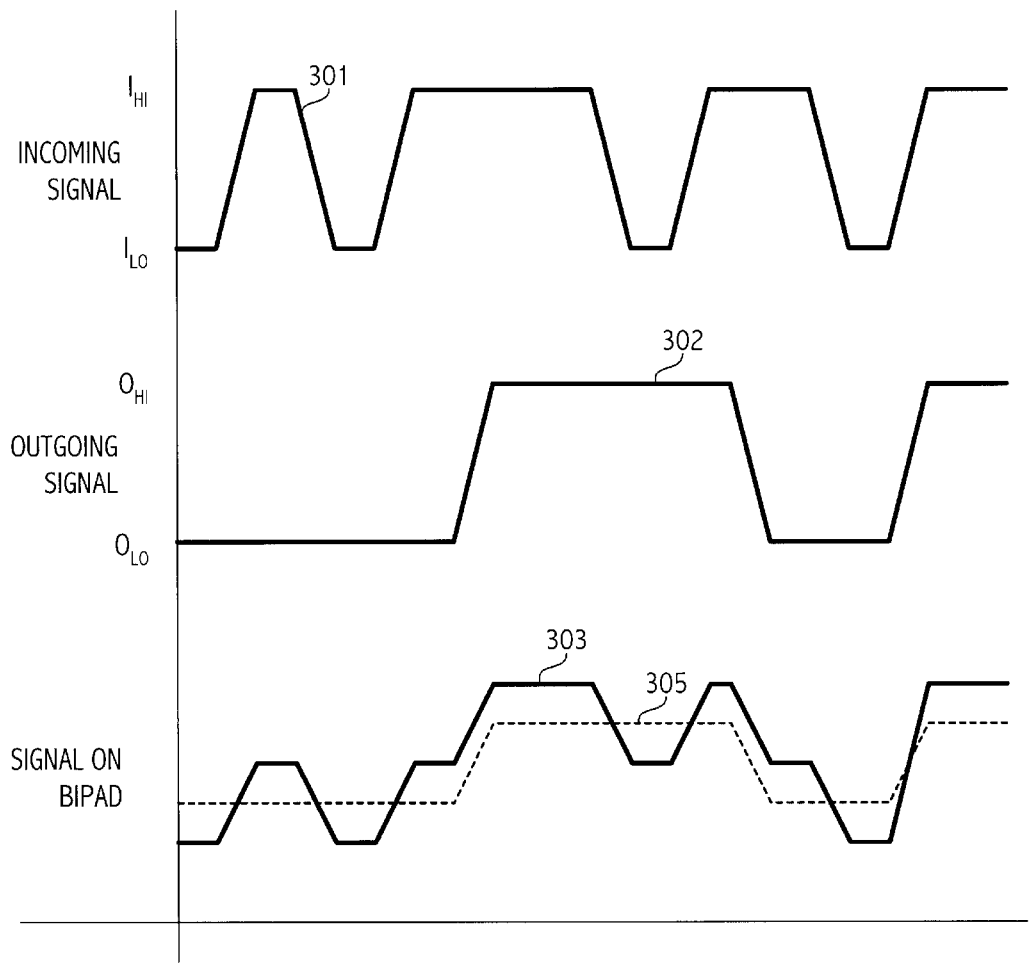
FIG. 3 illustrates idealized versions two signals superposed on a bi-directional transmission line, including incoming and outgoing signal such as might be transmitted by respective remote and local transceivers.

Whatever implementation of transmit and receive circuits employed, the bi-directional communication technique of the present invention will be better understood in the context of FIG. 6 and the waveforms of FIG. 3. For example, if we assume that a transmitter at each end of a bi-directional transmission line drives a sequence of $O_{HI}$ and $O_{LO}$ levels onto the bi-directional transmission line in accordance with respective data signals, then FIG. 3 illustrates the superposition of such signals observed at a point such as the bipad node of IC 502. The waveforms 301 and 302 illustrate incoming and outgoing components of a combined signal, where "incoming" and "outgoing" are from the perspective of IC 502.

Waveform 303 illustrates the combination of waveforms 301 and 302 on the bipad node when the outgoing chip's TX is reconnected to the bipad node. When both outgoing and incoming signals are high or low, the combined signal is also at the high or low level. However, when the outgoing and incoming signals are at opposite levels, the combined waveform is the average of the outgoing and incoming signals. A suitable reference signal 305 is illustrated with combined waveform 303. Using such a reference, IC 502 may evaluate the combined signal to determine whether the incoming signal value is high or low. In the case of the illustrated waveforms, a difference between the combined signal on the bipad node and such a reference yields an extracted incoming signal that is a ½ scaled version of the incoming signal.

Figure 4:
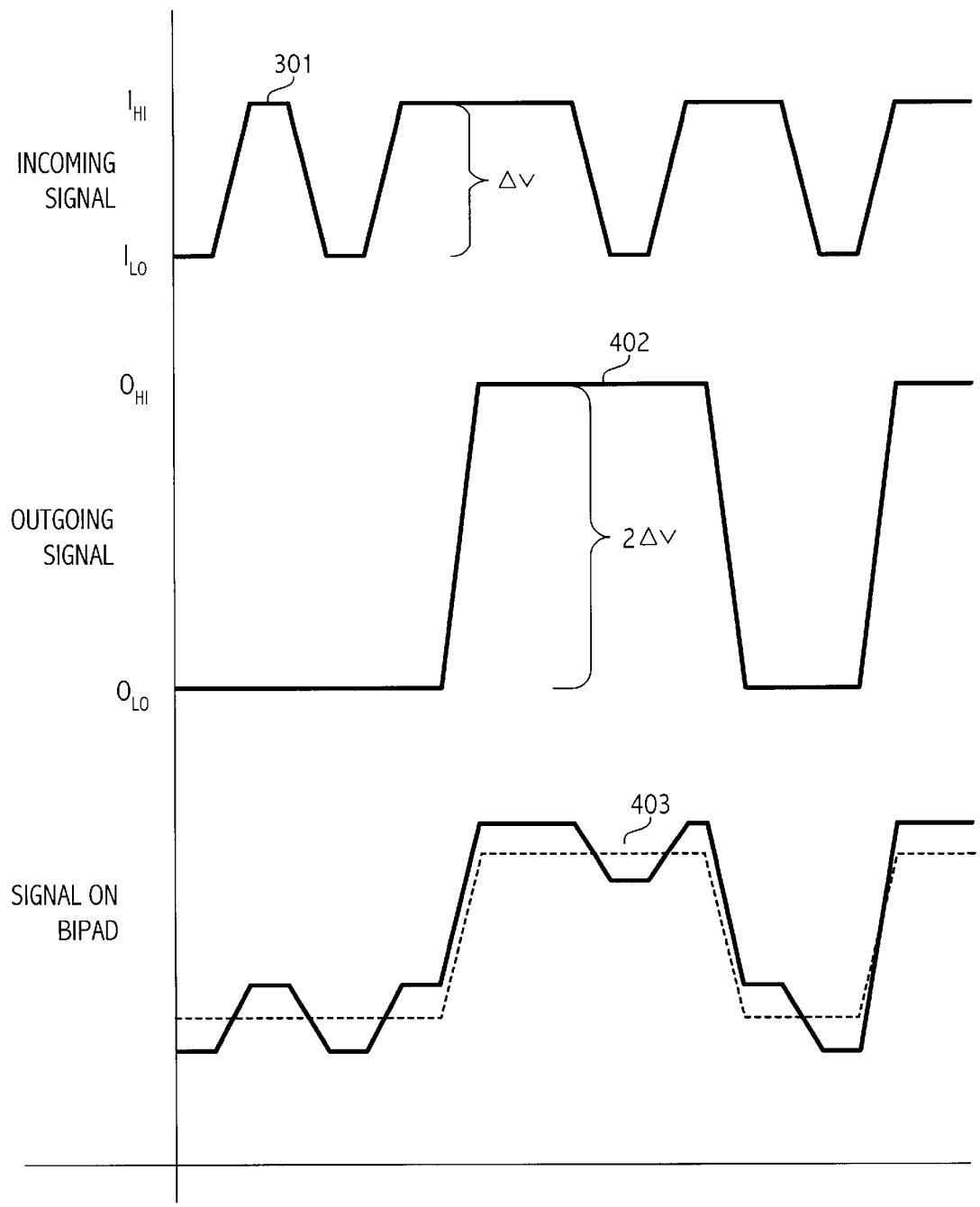
FIG. 4 illustrates idealized versions two signals superposed on a bi-directional transmission line, wherein an outgoing signal is of substantially higher amplitude than the incoming signal.

In FIG. 3, outgoing and incoming signals have the same $O_{HI}$ and $O_{LO}$ levels. However, in some systems it may be desirable to have opposing-end transmitters transmit at different levels. For example, a higher amplitude signal may be employed for transmission in a direction for which higher reliability or environmental noise immunity is required. FIG. 4 shows waveforms with a 2× signal strength advantage for the outgoing signal 402. A notable difference (as compared with waveforms of FIG. 3) is that the combination of $O_{HI}$ and $I_{LO}$ no longer resolves to the same combined level as the combination of $O_{LO}$ and $I_{HI}$. The reference 403 is modified accordingly.

If $O_{HI}$, $O_{LO}$, $I_{HI}$, and $I_{LO}$ levels were constant and unperturbed, then a reference would be easy to construct. However in real world systems, these levels vary based on a number of noise sources including noise from other digital and analog circuits on the same chip, board-level power supply voltage disturbances, simultaneous switching noise of the input and output circuits, etc. In general, noise on the high and low output levels can be broken up into its differential and common-mode components. As previously described, differential noise exhibits a constant average($O_{HI}$, $O_{LO}$), while common-mode noise exhibits a constant difference $O_{HI}-O_{LO}$. FIGS. 1C and 2C (previously described) separately illustrate effects of differential and common-mode noise.

FIG. 9 illustrates derivation of desired high and low reference levels that would track shifts in the $O_{HI}$, $O_{LO}$, $I_{HI}$ and $I_{LO}$ levels so that subtracting the appropriate reference from the combined bipad signal remove the outgoing data signal's influence and leave only the incoming data signal remaining. The desired reference includes one half of the output level being transmitted by the output driver (since that is the amount of the output driver's influence on the bipad signal) and the average of the high and low level (i.e., $I_{HI}$ and $I_{LO}$) for the incoming data signal.

FIG. 9 also illustrates values for the combined level on the bipad node and the desired references for specific voltages for the $O_{HI}$, $O_{LO}$, $I_{HI}$ and $I_{LO}$ levels. In the first example, the high and low levels on both chips are 1.0 and 0.0 volts. The combined signal on bipad takes values of 0.0, 0.5 or 1.0 volts, and the ideal references are 0.25 and 0.75 volts. In the second example, the outgoing high level ($O_{HI}$) is 2.0 volts. This causes the combined signal on bipad to take on four different values depending on the outgoing or the incoming data values. The desired high reference shifts up by 0.5 volts, which completely compensates for the high $O_{HI}$ level.

We now illustrate how the desired high and low reference levels may be generated by a combination of the echod, dref, and biref signals described above. Individually these signals provide a part of the correct tracking formula, then by constructing the reference as:

(biref−dref)+echod, the desired tracking coefficients are achieved. Referring back to FIG. 6, it will be understood that when coupled to opposing-end transceiver and reference configurations (e.g., as shown in FIG. 5), the bi-directional reference on bi-directional reference line 518 is:

$biref = \frac{1}{4}O_{HI} + \frac{1}{4}O_{LO} + \frac{1}{4}I_{HI} + \frac{1}{4}I_{LO}$ and that the local reference is:

$dref = \frac{1}{2}O_{HI} + \frac{1}{2}O_{LO}$.

The local echo signal is dependent on the transmitted value of outgoing data and, given the use of voltage divider 612, it will be understood as follows:

| | |
|---|---|
| if outgoing data is low: | $echod_{LO} = \frac{1}{4}O_{HI} + \frac{3}{4}O_{LO}$ |
| if outgoing data is high: | $echod_{HI} = \frac{3}{4}O_{HI} + \frac{1}{4}O_{LO}$. |

Accordingly, the combined reference is itself dependent on the transmitted value of outgoing data. For example:

| | |
|---|---|
| if outgoing data is low: | $ref_{LO}$ = (biref − dref) + $echod_{LO}$ |
| | = $\frac{1}{2} O_{LO} + \frac{1}{4} I_{HI} + \frac{1}{4} I_{LO}$ |
| if outgoing data is high: | $ref_{HI}$ = (biref − dref) + $echod_{HI}$ |
| | = $O_{HI} + \frac{1}{4} I_{HI} + \frac{1}{4} I_{LO}$ |

It is notable that the biref signal, which is connected to multiple receiver circuits, is not itself influenced by the outgoing data value. Hence, the outgoing data from other transmitters do not corrupt the reference for this receiver. This crosstalk immunity is particularly advantageous if the biref signal is to be shared among multiple transceivers (as illustrated in FIG. 5) to reduce the number of pins or other connection points used. The echod is generated individually for each transmitter. Since it matches and cancels the outgoing data pattern, it does not consume and pin, board, or cable resources. The dref signal can be generated locally to each transceiver to better match local $O_{HI}$ and $O_{LO}$ level shifts, or can be generated once and shared among multiple transceiver's reduced power and area usage.

In contrast, prior approaches described in Mooney et al. and Ishibashi et al. (each summarized above) exhibit substantial limitations. In particular, while the approach described in Mooney et al. includes contributions from both chips ($O_{HI}$, $O_{LO}$, $I_{HI}$ and $I_{LO}$) in high and low reference levels, the approach results in coefficients that differ from the desired reference described above. As a result, the approach of Mooney et al. incorrectly tracks differential shifts of the outgoing or incoming chip's high and low levels. The approach described in Ishibashi et al. relies entirely on local reference values and does not include any contribution from the incoming chip in the reference levels. Accordingly, the approach described in Ishibashi et al. is susceptible to common-mode shifts in the incoming chip's high and low levels.

FIGS. 10A and 10B illustrate some of these limitations in the context of exemplary perturbations or distortions in transmitted signal values. System A corresponds to the work described in Mooney et al. System B corresponds to the work described in Ishibashi et al. System C corresponds to an exemplary implementation in accordance with some embodiments of the present invention. In this regard, the perturbations and distortions in transmitted signal values and the particular response characteristics of System C are merely illustrative and are not to be taken as limitations on the scope of claims that follow.

In both FIGS. 10A and 10B, a left legend summarizes (for each system) the coefficients employed to weight each of the four output levels to construct the high and low reference levels. FIG. 10A illustrates performance of each system in a nominal scenario (scenario 1) without noise or distortion and in one particular differential noise scenario (scenario 2), namely, a 0.25-volt differential shift on each output level. FIG. 10B illustrates performance of each system in one particular common-mode noise scenario (scenario 3), namely, a 0.25-volt common-mode shift on each output level, and in a scenario (scenario 4) wherein an outgoing signal level exceeds an incoming signal level by a factor of two.

A table corresponding to each system and scenario lists four possible combinations of outgoing and incoming data values. For each combination, the combined voltage seen on the bipad node of the outgoing chip is listed, as is the reference voltage given the outgoing data value. Then, the bipad—ref signal that the receiver would use is listed. Finally, the rightmost column lists the amplitude the bipad—ref signal seen in the receiver as compared with an ideal difference.

Referring now to FIG. 10A and scenario 1 thereof, $O_{HI} = I_{HI} = 1.0$ volts, and $I_{HI} = I_{LO} = 0.0$ volts. As illustrated, the references for each system are each at the correct voltages and the signal amplitude seen in the receiver is 100% of the maximum possible. In contrast, for scenario 2, i.e., the case of a 0.25 volts of differential shift to each supply, system A fails, completely reducing the received amplitude to 0% in certain cases, which in turn would result in receive errors.

Referring to FIG. 10B and scenario 3 thereof (0.25 volts of common-mode shift to each supply), system B fails, reducing the received amplitude to 0% in certain cases, which in turn would result in receive errors. Finally, in scenario 4 (i.e., 2× larger outgoing signal levels), system A does not track correctly, but some signal is still received. However, system B again fails completely.

In contrast, system C completely tracks the shifts in the output high and low levels on both chips and 100% of the signal amplitude is recovered in the receiver in each scenario. System C sustains this performance advantage in other noise scenarios and in the presence of distortion since it is able to track the shifts on the four output levels using the desired coefficients.

As described above, an ability to pre-distort an outgoing signal may provide significant advantages in some implementations. As illustrated by scenario 4 and the robustness of system C to excursions in outgoing signal levels, the bi-directional reference techniques described herein facilitate use of a pre-distorting transmitter to compensate for intersymbol interference (ISI) in a communications channel. For example, in the context of FIG. 6, it is possible to use replicated instances of a pre-distorting transmitter to drive the bipad and echod nodes. In such a realization, the pre-distorted echod signal levels will change by the same amount as the pre-distorted bipad signal. Accordingly, the reference level will also change by the same pre-distorted amount since the reference level includes the echo component. Therefore, using the reference generation scheme presented herein, a transceiver of a bi-directional communication system can simultaneously (i) echo-cancel a predistorted output signal, (ii) account for locally sourced common-mode and differential noise shifts on the output high and low levels and (iii) account for common-mode and differential noise shifts introduced at a remote transceiver.

Other Embodiments

While the invention has been described with reference to various embodiments, it will be understood that these embodiments are illustrative and that the scope of the invention is not limited to them. Many variations, modifications, additions, and improvements are possible. For example, while a two-level signaling regime has been employed for clarity of description, persons of ordinary skill in the art will recognize that the techniques described herein may be adapted for multi-level signaling.

In one such adaptation, multi-level signaling is provided by:

1. Replacing transmit data signal 620 and transmitter drivers 602 and 604 with a multi-level data signal and multi-level drivers;
2. Replacing biref generator 520 and biref signal 522 with m generators and corresponding signals $biref_1$ to $biref_m$, where m=n−1 and n is the number of levels for the data signal. Note that for the binary (two-level) signaling implementation described elsewhere herein, n=2 and m=1. The m biref generators then output m signals ($biref_1 \ldots biref_m$) whose values are correspond to values midway between each of the multi-level output values from the transmitters;
3. Replacing receive amplifier 624 and receive data signal 622 with m substantially identical receive amplifiers and signals, wherein each receive amplifier is connected (e.g., as shown in FIG. 6) to the bipad, echod, and dref signals, but with a connection to a respective one of the m biref signals; and
4. Finally, by adding decoding logic applied to the m receive data signals to perform a thermometer to binary encoding conversion.

In general, correspondence between transmitted signal levels and power supply voltages in illustrated configurations is merely exemplary. Additionally, while some of the description herein has presumed 8 parallel bi-directional communications channels with respective transceivers each sharing a bi-directional reference channel, larger or smaller numbers of bi-directional communications channels are possible.

More generally, plural instances may be provided for components described herein as a single instance. Boundaries between various components or circuit blocks are somewhat arbitrary and operation is illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A transceiver for bi-directional communications via a channel, the transceiver comprising:
   a bi-directional data node for coupling to the bi-directional communications channel;
   a bi-directional reference node for coupling to a bi-directional reference channel;
   a receiver circuit coupled to both the bi-directional data node and the bi-directional reference node, the receiver circuit tracking both common-mode and differential noise introduced at an opposing end of the communications channel; and
   a local reference node coupled to the receiver circuit, the receiver circuit thereby tracking both common-mode and differential noise introduced at local end of the bi-directional communications channel.

2. The transceiver of claim 1,
   wherein the receiver circuit combines a data-dependent local echo signal and a data-independent bi-directional reference signal coupled from the bi-directional reference node.

3. The transceiver of claim 1, further comprising:
   a transmit circuit that predistorts an outgoing signal transmitted via the bi-directional communications channel,
   wherein the receiver circuit combines a predistorted data-dependent local echo signal and a data-independent bi-directional reference signal coupled from the bi-directional reference node.

4. The transceiver of claim 1,
   wherein the receiver circuit operates on a combined incoming and outgoing signal from the bi-directional data node and extracts the incoming signal therefrom without use of separate data value dependent bi-directional reference channels.

5. The transceiver of claim 1,
   wherein the receiver circuit operates on combined incoming and outgoing signals from the bi-directional data node and extracts the incoming signal therefrom without switching amongst plural data-value specific reference channels.

6. The transceiver of claim 1,
   further comprising plural additional bi-directional data nodes for coupling to respective additional bi-directional communication channels;
   wherein the receiver circuit extracts an incoming signal from that presented at the bi-directional data node without reference channel switching induced crosstalk amongst the bi-directional communication channels.

7. The transceiver of claim 6,
   further comprising plural additional receiver circuits substantially identical to the receiver circuit, the additional receiver circuits coupled to respective ones of the additional bi-directional data nodes and to the bi-directional reference node.

8. The transceiver of claim 1,
   wherein the signals transmitted via the communications channel include first and second signal values;
   wherein a bi-directional reference supplied at the bi-directional reference node approximates a mid-point value between the first and second signal values.

9. The transceiver of claim 1,
   wherein the receiver includes a combining circuit and decision amplifier.

10. A transceiver for bi-directional communications via a channel, the transceiver comprising:
    a bi-directional data node for coupling to the bi-directional communications channel;
    a bi-directional reference node for coupling to a bi-directional reference channel; and a receiver circuit coupled to both the bi-directional data node and the bi-directional receiver node, the receiver circuit tracking both common-mode and differential noise introduced at an opposing end of the communications channel;

wherein signals transmitted via the communications channel include multi-level signal with a number of signal values, n>2, the transceiver further comprising:

additional (n–2) bi-directional reference nodes for coupling to respective additional bi-directional reference channels; and additional (n–2) receiver circuits individually coupled to bi-directional data node and to a respective one of the bi-directional reference nodes.

11. The transceiver of claim 10, wherein respective bi-directional references supplied at the bi-directional reference nodes approximate respective mid-point values between corresponding pairs of the signal values.

12. A transceiver for bi-directional communications via a channel, the transceiver comprising:

a bi-directional data node for coupling to the bi-directional communications channel;

a bi-directional reference node for coupling to a bi-directional reference channel;

a receiver circuit coupled to both the bi-directional data node and the bi-directional reference node, the receiver circuit tracking both common-mode and differential noise introduced at an opposing end of the communications channel; and a pair of matched transmit circuits, the first transmit circuit coupled to the bi-directional data node and the second transmit circuit coupled to supply the receiver circuit with a local echo signal.

13. The transceiver of claim 12, wherein signals received via the bi-directional communications channel are susceptible to intersymbol interference; and wherein the matched transmit circuits predistort respective outgoing and local echo signals.

14. A transceiver for bi-directional communications via a channel, the transceiver comprising:

a bi-directional data node for coupling to the bi-directional communications channel;

a bi-directional reference node for coupling to a bi-directional reference channel; and a receiver circuit coupled to both the bi-directional data node and the bi-directional reference node, the receiver circuit tracking both common-mode and differential noise introduced at an opposing end of the communications channel, wherein the receiver circuit combines:

a bi-directional data signal;

a local echo signal;

a bi-directional reference signal; and a local reference signal.

15. The transceiver of claim 14, further comprising:

a transmit circuit that predistorts an outgoing signal transmitted via the bi-directional communications channel.

16. The transceiver of claim 14, wherein the local echo signal is predistorted.

17. The transceiver of claim 14, wherein the local signal is data-dependent.

18. The transceiver of claim 14, wherein the bi-directional reference signal is data-independent.

19. The transceiver of claim 14, further comprising:

plural additional bi-directional data nodes for coupling to respective additional bi-directional communication channels, wherein the receiver circuit extracts an incoming signal from that presented at the bi-directional data node without reference channel switching induced crosstalk amongst the bi-directional communication channels.

20. The transceiver of claim 19, further comprising:

plural additional receiver circuits substantially identical to the receiver circuit, the additional receiver circuits coupled to respective ones of the additional bi-directional data nodes and to the bi-directional reference node.

21. A transceiver for bi-directional communications via a channel, the transceiver comprising:

a bi-directional data node for coupling to the bi-directional communications channel;

a bi-directional reference node for coupling to a bi-directional reference channel; and a receiver circuit coupled to both the bi-directional data node and the bi-directional reference node, the receiver circuit tracking both common-mode and differential noise introduced at an opposing end of the communications channel, wherein the receiver circuit constructs a data-dependent reference from:

a local echo signal;

a bi-directional reference that is independent of any particular data value transmitted via the bi-directional communications channel; and a local reference.

22. The transceiver of claim 21, further comprising:

a transmit circuit that predistorts an outgoing signal transmitted via the bi-directional communications channel.

23. The transceiver of claim 21, wherein the local echo signal is predistorted.

24. The transceiver of claim 21 wherein the local echo signal is data-dependent.

25. The transceiver of claim 21, further comprising:

plural additional bi-directional data nodes for coupling to respective additional bi-directional communication channels, wherein the receiver circuit extracts an incoming signal from that presented at the bi-directional data node without reference channel switching induced crosstalk amongst the bi-directional communication channels.

26. The transceiver of claim 15, further comprising:

plural additional receiver circuits substantially identical to the receiver circuit, the additional receiver circuits coupled to respective ones of the additional bi-directional data nodes and to the bi-directional reference node.

27. An apparatus comprising:

a transmit circuit coupled to a bi-directional data node;

an echo data node;

a local reference node;

a bi-directional reference node; and a receiver circuit coupled to the bi-directional data node, the echo data node, the local reference node and the bi-directional reference node to combine signals presented thereon, the receiver circuit extracting an incoming signal component from that presented at the bi-directional data node and compensating for both common-mode and differential noise introduced at either end of a bi-directional communications channel coupled thereto.

28. The apparatus of claim 27, wherein the signal presented at the echo data node and an outgoing component of the signal presented at the bi-directional data node are each pre-distorted in accordance with expected intersymbol interference.

29. The apparatus of claim 27, further comprising:
additional receiver circuits coupled to the bi-directional reference node,
wherein the compensating does not couple transmitted data dependent crosstalk into the additional receiver circuits.

30. The apparatus of claim 27, further comprising:
at least a portion of a bi-directional communications channel coupled to the bi-directional data node; and
at least a portion of a bi-directional reference channel coupled to the bi-directional reference node.

31. A bi-directional communication system comprising:
a bi-directional reference channel for communicating a bi-directional reference signal including both an incoming reference and an outgoing reference contribution thereto;
plural bi-directional communication channels, each for communicating a data signal that includes both an incoming signal and an outgoing signal transmitted thereon; and
a first transceiver including plural receivers each coupled to a respective one of the bi-directional communication channels, the receivers further coupled to the bi-directional reference channel and to respective local reference nodes, each of the receivers being configured to obtain the respective incoming signal from the respective data signal using a composite data-dependent reference including contributions of the bi-directional reference signal, at least one local reference signal, and a local echo signal corresponding to the respective outgoing signal.

32. The bi-directional communication system of claim 31, further comprising:
a second transceiver including plural receivers each coupled to a respective one of the bi-directional communication channels, the receivers further coupled to the bi-directional reference channel and to respective reference nodes local thereto.

33. The bi-directional communication system of claim 32, wherein the first and second transceivers reside on separate integrated circuit chips; and
wherein the bi-directional communication channels and the bi-directional reference channel are each defined, at least in part, by one or more of:
a printed circuit board trace;
a connector; and
a transmission cable.

34. The bi-directional communication system of claim 31, wherein the respective local reference nodes for two or more of the receivers are implemented as a shared reference node.

35. A bi-directional signaling method comprising:
receiving on a bi-directional transmission line, a data signal that includes both an incoming signal and an outgoing signal transmitted thereon;
receiving on a bi-directional reference transmission line, a bi-directional reference signal including both an incoming reference and an outgoing reference contribution thereto; and
obtaining the incoming signal from the data signal using a composite data-dependent reference including contributions of the bi-directional reference signal, a local reference signal, and a local echo signal corresponding to the outgoing signal.

36. The method of claim 35, wherein both the outgoing signal and the local echo signal corresponding thereto are predistorted to account for dispersion in the bi-directional transmission line.

37. The method of claim 35, further comprising:
receiving on plural additional bi-directional transmission lines, respective additional data signals that include respective incoming and outgoing signals transmitted thereon; and
obtaining the respective incoming signal from the respective data signals using respective composite data-dependent references including contributions of the bi-directional reference signal, the local reference, and respective local echo signals corresponding to the respective outgoing signals.

38. An apparatus comprising:
a bi-directional data node;
an echo data node;
a local reference node;
a bi-directional reference node; and
means for receiving an incoming signal from that presented at the bi-directional data node, the receiving means including means for compensating for both common-mode and differential noise introduced at either end of a bi-directional communications channel coupled to the bi-directional data node.

39. The apparatus of claim 38, further comprising:
means for compensating for dispersion in the bi-directional communications channel.

40. A bi-directional signaling system further comprising:
means for receiving on a bi-directional transmission line, a data signal that includes both an incoming signal and an outgoing transmitted thereon;
means for receiving on a bi-directional reference transmission line, a bi-directional reference signal including both an incoming reference and an outgoing reference contribution thereto; and
means for obtaining the incoming signal from the data signal using a composite data-directional reference including contributions of the bi-directional reference signal, a local reference signal, and a local echo signal corresponding to the outgoing signal.

41. The system of claim 40, further comprising:
means for receiving on plural additional bi-directional transmission lines, respective additional data signals that include respective incoming and outgoing signals transmitted thereon; and
means for obtaining the respective incoming signal from the data signals using respective composite data-directional references including contributions of the bi-directional reference signal, the local reference, and respective local echo signals corresponding to the respective outgoing signals.

* * * * *

UNITED STATES PATENT AND TRADEMARK OFFICE
CERTIFICATE OF CORRECTION

PATENT NO. : 6,738,415 B2
DATED : May 18, 2004
INVENTOR(S) : Robert J. Drost and Robert J. Bosnyak It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 225 days. --.

Column 12,
Line 8, "a local reference node" should read -- a local data reference node --.

Column 13,
Line 2, "the bi-directional receiver" should read -- the bi-directional reference --.
Line 7, "multi-level signal" should read -- multi-level signals --.
Line 13, "to bi-directional data node" should read -- to the bi-directional data node --.

Column 14,
Line 48, "claim 15" should read -- claim 25 --.

Column 16,
Line 40, "an outgoing transmitted thereon" should read -- an outgoing signal transmitted thereon --.

Signed and Sealed this

Thirtieth Day of August, 2005

JON W. DUDAS
*Director of the United States Patent and Trademark Office*